US011317255B2

(12) United States Patent
Shah et al.

(10) Patent No.: US 11,317,255 B2
(45) Date of Patent: Apr. 26, 2022

(54) CROSS NETWORK RICH COMMUNICATIONS SERVICES CONTENT

(71) Applicant: T-Mobile USA, Inc., Bellevue, WA (US)

(72) Inventors: Neha Shah, Issaquah, WA (US); Maziar Fallah, Preston, WA (US); Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/827,096

(22) Filed: Mar. 23, 2020

(65) Prior Publication Data

US 2020/0359179 A1 Nov. 12, 2020

Related U.S. Application Data

(60) Provisional application No. 62/844,614, filed on May 7, 2019.

(51) Int. Cl.
*G06F 15/16* (2006.01)
*H04W 4/12* (2009.01)
(Continued)

(52) U.S. Cl.
CPC ............ *H04W 4/12* (2013.01); *G06F 16/13* (2019.01); *G06F 16/9566* (2019.01);
(Continued)

(58) Field of Classification Search
CPC ...... G06F 16/9566; G06F 16/13; G06F 16/14; H04L 61/157; H04L 61/301;
(Continued)

(56) References Cited

U.S. PATENT DOCUMENTS 7,650,392 B1 * 1/2010 Goodwin ................ H04L 67/02
709/219
8,640,137 B1 * 1/2014 Bostic ................... G06F 16/245
718/104
(Continued)

OTHER PUBLICATIONS

GSMA, "Rich Communication Suite 9.0 Advanced Communications Services and Client Specification", Version 10.0, Dec. 6, 2018, pp. 1-398, retrieved from <https://www.gsma.com/futurenetworks/wp-content/uploads/2019/09/RCC.07-v10.0.pdf> on Mar. 22, 2021. (Year: 2018).*

(Continued)

*Primary Examiner* — Liang Che A Wang
(74) *Attorney, Agent, or Firm* — Lee & Hayes, P.C.

(57) ABSTRACT

When a Rich Communications Services (RCS) data file is to be provided to a terminating user equipment (UE) that is on a different mobile communications network than an originating UE, the network address, or uniform resource locator (URL), of the RCS data file may be modified to indicate that the RCS data file is to traverse a network-to-network interface (NNI). An RCS system on the originating mobile communications network may identify if the terminating UE is on the same or different mobile communications network. If the terminating UE is on a different mobile communications network, then the RCS system may modify the URL to indicate the originating and terminating mobile communications networks and send the URL to an RCS system of the terminating mobile communications network. The modified URL enables retrieval of the RCS data file network by a content system of the terminating mobile communications network.

20 Claims, 8 Drawing Sheets

(51) Int. Cl.
*G06F 16/955* (2019.01)
*G06F 16/13* (2019.01)
*H04L 67/02* (2022.01)
*H04L 67/04* (2022.01)
*H04L 67/06* (2022.01)

(52) U.S. Cl.
CPC .............. *H04L 67/02* (2013.01); *H04L 67/04* (2013.01); *H04L 67/06* (2013.01)

(58) Field of Classification Search
CPC ....... H04L 61/305; H04L 67/02; H04L 67/04; H04L 67/06; H04L 67/2847; H04W 4/12; H04W 4/203
USPC .......................... 709/206, 217, 218, 219, 226
See application file for complete search history.

(56) References Cited

U.S. PATENT DOCUMENTS

| | | | | |
|---|---|---|---|---|
| 9,451,335 | B2* | 9/2016 | Gopalan | H04N 21/4532 |
| 10,326,804 | B1* | 6/2019 | Agarwal | H04L 69/08 |
| 2008/0016233 | A1* | 1/2008 | Schneider | G06F 16/951 |
| | | | | 709/230 |
| 2008/0130523 | A1* | 6/2008 | Fridman | H04W 8/28 |
| | | | | 370/259 |
| 2008/0263193 | A1* | 10/2008 | Chalemin | H04L 67/02 |
| | | | | 709/224 |
| 2011/0069661 | A1* | 3/2011 | Waytena, Jr | H04L 63/083 |
| | | | | 370/328 |
| 2011/0246267 | A1* | 10/2011 | Williams | G06Q 30/08 |
| | | | | 705/14.4 |
| 2011/0307561 | A1* | 12/2011 | Gao | H04H 20/42 |
| | | | | 709/206 |
| 2015/0257817 | A1* | 9/2015 | Zoran | A61B 18/042 |
| | | | | 606/45 |
| 2016/0316032 | A1* | 10/2016 | Brunn | H04L 67/06 |
| 2017/0149860 | A1* | 5/2017 | Ben Eli | H04L 67/28 |
| 2017/0208462 | A1* | 7/2017 | Zaifuddin | H04W 12/033 |
| 2018/0124124 | A1* | 5/2018 | Corona | H04L 65/105 |
| 2019/0081783 | A1* | 3/2019 | Bohli | G06F 3/067 |

OTHER PUBLICATIONS

The Extended European Search Report dated Jun. 24, 2020 for European Patent Application No. 20171671.9, 8 pages.
GSM Association, "DNS and ENUM Guidelines for Service Providers and GRX and IPX Providers, Version 15.0", retrieved on Jun. 8, 2020 at <<https://www.gsma.com/newsroom/wp-content/uploads//IR.67-v15.0.pdf>>, GSMA, Jun. 29, 2018, pp. 1-71.
GSM Association, "Rich Communication Suite 9.0, Advanced Communications, Services and Client Specification, Version 10.0", retrieved on Jun. 5, 2020 at <<https://www.gsma.com/futurenetworks/wp-content/uploads/2019/09/RCC.07-vIO.O.pdf>>, GSMA, pp. 1-398.

* cited by examiner

CROSS NETWORK RICH
COMMUNICATIONS SERVICES CONTENT

CROSS REFERENCE TO RELATED APPLICATIONS

This application claims priority to U.S. Provisional Patent Application No. 62/844,614 filed May 7, 2019, entitled "URL Manipulation for Localization (NNI)," which is incorporated herein by reference in its entirety.

BACKGROUND

To enable evolving Universal Profile (UP) standards for Rich Communications Services (RCS), Mobile Network Operators (MNOs) may need to identify whether an RCS message is to traverse a Network-to-Network Interface (NNI). Content systems may need originating MNO identity to retrieve an RCS data file from another content system. Without information about the originating location of the RCS data file, it may be difficult for the content systems to locate the RCS files that are to be provided to subscribers on their networks.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
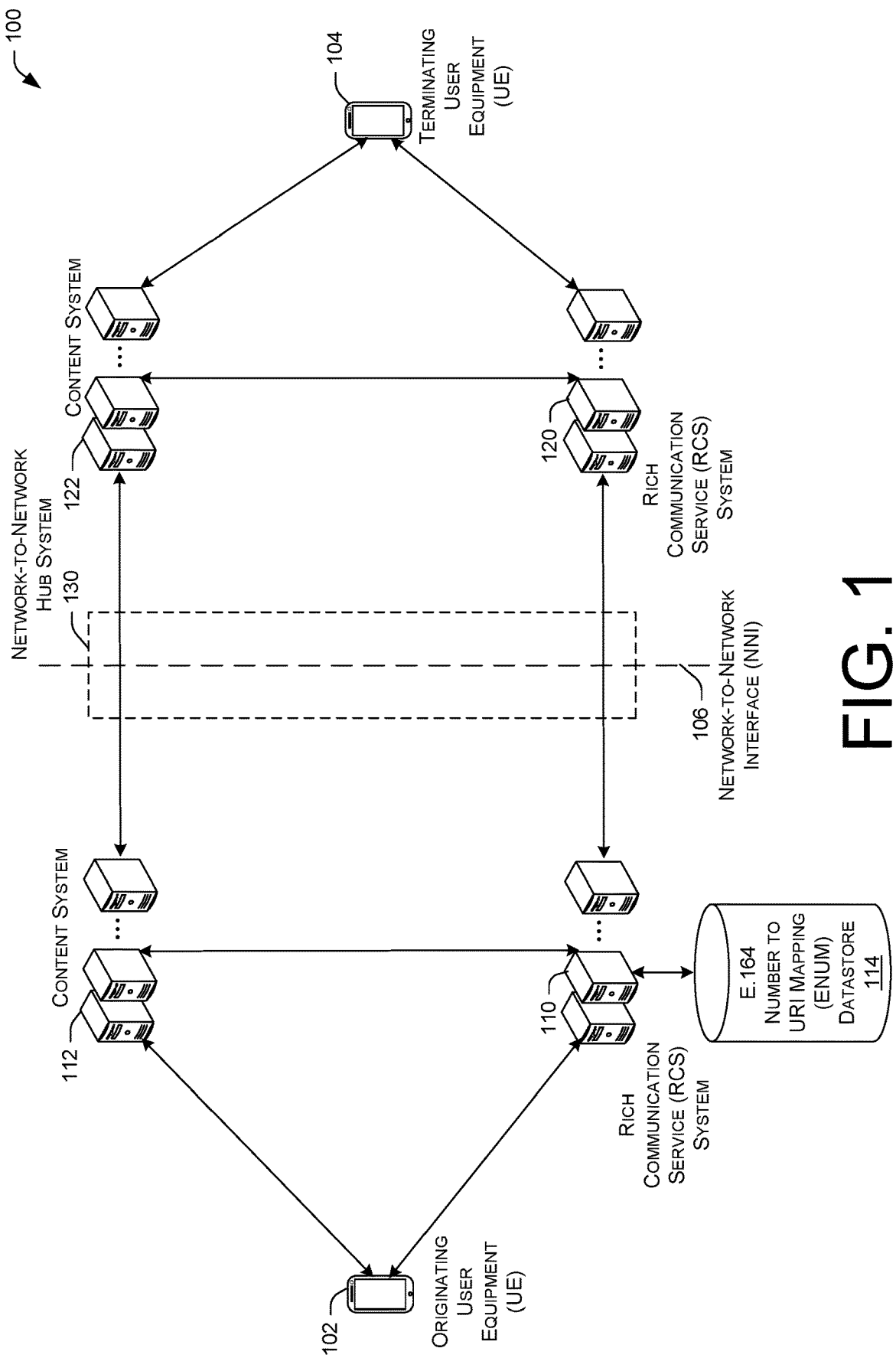
FIG. 1 illustrates a schematic diagram of an example environment with mobile communications network infrastructure including a first mobile network operator (MNO) with an originating user equipment (UE) that may send a rich communications service (RCS) message to a terminating UE of a second MNO, in accordance with example embodiments of the disclosure.

Example embodiments of this disclosure describe methods, apparatuses, computer-readable media, and systems for a network address and/or uniform resource locator (URL) manipulation function to enable a mobile network operator (MNO) of a mobile communications network to identify a source of a rich communication service (RCS) data file. The transmission of an RCS message entails receiving an RCS data file from an originating user equipment (UE) and then providing that RCS data file to a terminating UE. The RCS data file includes content of the RCS message that is provided by the originating UE and consumed by the terminating UE. Example embodiments of the disclosure herein enables the transmission of the RCS data file when the RCS data file is to traverse a Network-to-Network Interface (NNI) between a first or originating MNO and a second or terminating MNO. The NNI may be directly between two MNOs or via a network hub system between the two wireless communication networks.

According to example embodiments of the disclosure, when an RCS file is to traverse an NNI between MNOs, a localization mechanism may be deployed for the purposes of downloading the RCS data file by the terminating UE. Content systems of a mobile network may store and/or retrieve the RCS data files that are to be sent from an originating UE to a terminating UE. When a content system on a mobile communications network is sent an RCS data file, the content system is configured to store that data file and provide a network address, such as a uniform resource locator (URL) of that RCS data file. Additionally, when a content system is presented with a network address, such as an URL, the content system may retrieve the RCS data file and provide the RCS data file to the entity, such as the terminating UE, that presented the URL. When retrieving the RCS data file, the content system, according to example embodiments, identifies whether the RCS data file is stored locally (e.g., within the same mobile communications network as the content system) or on a different mobile communications network operated by a different MNO.

In the cases where a content system is to retrieve an RCS data file from a different mobile communications network, the content system may cooperate with a content system of the other network to locate and retrieve the RCS data file. Thus, according to example embodiments, the content sever on the terminating MNO is configured to identify the content system of the originating MNO associated with the RCS data file, based at least in part on the RCS data file URL presented. In other words, according to example embodiments, the URL itself, as presented to the content system, provides a mechanism to identify the originating MNO of the RCS data file.

According to example embodiments, when an originating UE operating on a first mobile network is to send an RCS message to a receiving or terminating UE on a second mobile network, the originating UE may send a data file, such as an RCS data file associated with the RCS message, to the content system of the first mobile network. This content system may store the data file and provide a network address, such as an URL pointing to the storage location of the RCS data file, to the originating UE. The originating UE may provide the URL to an RCS system of the first mobile network. The RCS system of the first mobile network may then access an E.164 Number to uniform resource identifier (URI) Mapping (ENUM) database to determine whether the terminating UE is on the same, first mobile communications network, or a different, second mobile communications network. The RCS system may make this determination based at least in part on a phone number or any other identifying information of the terminating UE. The RCS system may handle the RCS data file URL differently if the terminating UE is on a second mobile network than if the terminating UE is one the first network, as described herein.

If the RCS system of the first network determines that the terminating UE is on the same, first network as the originating UE, then the RCS system may send the RCS data file URL, as received from the originating UE to the terminating UE. However, if the terminating UE is on the second, separate mobile network, the RCS system of the first mobile network may modify the RCS data file URL to indicate the second mobile network and then send the modified URL to an RCS system of the second mobile network. For example, when an RCS message is going from the first network to the second network, the URL may be modified by the RCS system from "first_network.mstore.com" to "nni.second_network.first_network.mstore.com." In the modified URL, "second_network" may indicate an identifier of the second mobile network, such as "tmo" for TMOBILE, "verizon" for VERIZON, "att" for AT&T, or the like. Similarly, "first_network" may indicate an identifier of the first mobile network. It should be understood that the URL modification format as shown here is an example, and the disclosure contemplates any suitable URL modification that provides an indication of the second mobile network (e.g., the second MNO), the first mobile network (e.g., the first MNO), and/or an indication that the RCS message is traversing an NNI. The RCS system of the first mobile communications network may send the modified URL to an RCS system of the second mobile communications network.

The RCS system of the second mobile network may provide the modified URL to a content system of the second mobile network. The content system of the second mobile network, based on the modified URL will be able to identify the originating mobile network, in this case the first mobile network. The content system of the second mobile network may fetch the RCS file from the content system of the first mobile network and store the RCS file locally on the second mobile network with a corresponding URL. This URL pointing to the content file on the second mobile network may be sent back to the RCS system of the second mobile network, which then routes that URL to the terminating UE. The terminating UE may then use the URL pointing to the storage location on the second mobile network to obtain the RCS data file.

The mechanisms as disclosed herein allows content system(s) and/or RCS system(s) to distinguish internal traffic versus NNI traffic and apply additional handling to the NNI traffic. As discussed herein, this localization mechanism is useful for RCS message transmission across NNI and for file transfer of the RCS data files, such as over Hypertext Transfer Protocol (HTTP) flow. According to example embodiments of the disclosure, a content system may determine, based at least in part on the URL, whether it is to retrieve an RCS file via HTTP transfer from another content system across an NNI. In other words, when an originating UE, sending an RCS message, and a terminating UE, receiving the RCS message, are on separate mobile networks, the content system associated with the terminating UE may identify the originating MNO based at least in part on the network address (e.g., URL) of the RCS data file associated with the RCS message. Upon determining the originating MNO of the RCS data file, the content system associated with the terminating UE may retrieve the RCS data file from the content system associated with the originating UE. At this point, the terminating UE can receive the RCS data file from its local content system(s).

It should be appreciated that the mechanisms, as disclosed herein, may enable features of evolving RCS communications. MNOs providing RCS services will need to distinguish locally stored RCS data files from those stored remote to their own mobile communications network. Additionally, the RCS system(s) will need to determine how and where to forward network addresses of RCS data files for RCS messages that terminate on a different mobile communications network. The disclosure herein provides these and other technological solutions in the realm of mobile communications. As a result, the mechanisms as described herein enables and/or improves new and/or emerging communications services.

Additionally, as a result of the URL modification, the content system and the RCS system of the second mobile network may be able to identify that the RCS data file is to be obtained from the content system of a different mobile network without any additional steps. This makes the RCS transfer process more efficient, since the receiving mobile network already has an indication that the RCS data file needs to be retrieved from another mobile network content system and therefore, does not need to identify the mobile network of the originating UE. Additionally, the content system providing the RCS data file may identify that the requestor of the RCS file is a content system from another mobile network and implement any security or other protocols that may be needed for the RCS data file having to traverse across mobile networks.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with mobile network cell infrastructure including a first mobile network operator (MNO) with an originating user equipment (UE) 102 that may send a rich communications service (RCS) message to a terminating UE 104 on a second MNO, in accordance with example embodiments of the disclosure.

The originating UE 102 may be configured to send an RCS message, as described herein, by interacting with one or more other entities in environment 100. The originating UE 102 may be associated with (e.g., belong to) a user who may be able to use the originating UE 102 to initiate sending an RCS message with an associated RCS data file to the terminating UE 104. For example, the user of the originating UE 102 may designate content (e.g., text, video, audio, etc.) stored on the originating UE 102 to be sent as an RCS message. The originating UE 102 may be configured to accept user input indicating content to be sent as an RCS message and generate an RCS data file associated with that content. The originating UE 102 may then send the RCS data file to a content system 112 for further transmission to the terminating UE 104. The transmission of the RCS data file may entail radio links with the content system 112 and/or any intermediary entities, such as radio nodes (e.g., eNodeB, gNodeB, etc.), using any suitable messaging protocols, such as session initiation protocol (SIP) messages and/or message session relay protocol (MSRP) messages.

Similar to the originating UE 102, the terminating UE 104 may be configured to interact with one or more other entities of environment 100 to receive the RCS message and associated RCS data file, such as from content system 122. The terminating UE 104 may be configured to render the RCS message, and the content thereof, to a user associated with the terminating UE 104. The terminating UE 104 may execute the mechanisms as discussed herein to receive the RCS message originating from a different MNO than the MNO of the terminating UE 104.

The UEs 102, 104 may have a communications application and/or software installed thereon that allows the UEs 102, 104 to interact with users to conduct the communications session. The UEs 102, 104 may be configured to identify that a user requests communications services, such as via interaction with the user via one or more user interfaces (e.g., touch screen), and may cooperate with one or more mobile network infrastructure to provide those communications services, such as RCS messaging. In addition to RCS messaging services the UEs 102, 104 may be able to interact with one or more of the entities of environment 100 to provide one or more additional communications services, such as data, voice, short message service (SMS), A/V calls, and/or other mobile communications services. The UEs 102, 104 may interact with network infrastructure via any variety of communications protocols and/or communications generations, such as third generation (3G), fourth generation (4G), long-term evolution (LTE), fifth generation (5G), 5G new radio (5G NR), any variety of millimeter wave standards, or the like.

Although the UEs 102, 104 are depicted as a smartphone, the UEs 102, 104 may be any suitable communications devices configured to send and/or receive RCS messages, such as a laptop computer, a tablet computer, and a voice device, and/or any suitable UE 102, 104 that can make and/or receive RCS messages. UEs 102, 104 may further include, but are not limited to, televisions, set-top boxes, computers, computing devices, servers, notebook computers, netbook computers, personal digital assistants (PDAs), smartphones, telephones, tablets, in-vehicle infotainment systems (IVIs), Internet of Things (IoT) devices, combinations thereof, or the like.

The environment 100 may also include a content system 112 associated with the originating UE 102 and content system 122 associated with the terminating UE 104. The content systems 112, 122 may be configured to store and/or retrieve data, such as RCS data files, to enable any variety of communications services, such as RCS messaging. These storage and/or retrieval functions may be performed according to any suitable protocol, such as over Hypertext Transfer Protocol Secure (HTTPS) flow. For example, RCS data files may be received via an HTTPS Post process and a providing the RCS data file may be performed by an HTTPS Get process.

When an RCS message is to be sent, the content systems 112, 122 may be configured to receive the associated RCS data file of the RCS message and store that RCS data file in storage, such as in one or more datastores of the content systems 112, 122. The content systems 112, 122 may then be able to provide a network address where the RCS data file was stored. In some cases, the RCS data files may be received from the UEs 102, 104 as an HTTP Post message and the network address, such as an URL, may be provided to the UE 102, 104 from which the RCS data file is received.

The content systems 112, 122 are additionally configured to receive an URL, such as by an HTTPS Get process, and provide an RCS data file stored at the storage location associated with the URL. If the URL indicates that the RCS data file is stored locally (e.g., within the same mobile communications network as the content system 112, 122 and/or the UE 102, 104 from which the URL is received), then the content systems 112, 122 may access the storage locations indicated int eh URL and retrieve the RCS data file. The content systems 112, 122 may then provide the RCS data file to the UE 102, 104 from where the URL was received.

In some cases, the content systems 112, 122 may receive an URL (e.g., an URL modified according to the disclosure herein), such as from the RCS systems 112, 122, that indicates that the corresponding RCS data file is not locally stored. The content system 112, 122 may be configured to determine that the RCS data file is to be obtained from another content system 112, 122 associated with a different MNO based at least in part on the received modified URL. The content system 112, 122 may further be configured to interact with another content system 112, 122 of a different MNO to retrieve the RCS data file associated with the URL received by the content system 112, 122. The content system 112, 122 may receive the modified URL from the RCS system 110, 120 of the same mobile communications network. The content systems 112, 122 may use this modified URL to determine the MNO associated with the RCS data file to be obtained and obtain the RCS data file from another content system 112, 122 of the other MNO. Any suitable protocol and/or communications mechanisms may be used by the content systems 112, 122 to obtain the RCS data file from another content system 112, 122, such as HTTPS processes. It should be understood that HTTPS may be one example of a secure communications protocol between two content systems 112, 122 on two different mobile communications networks. Indeed, any suitable communications protocols may be used, such as any type of transport layer security (TLS) encryption, secure socket layer (SSL) encryption, or the like When a content system 112, 122 receives an RCS data file from another content system 112, 122 responsive to providing the other content system 112, 122 with the modified URL, the content system 112, 122 may be configured to store the obtained RCS data file locally. The locally stored RCS data file will have a local network address, such as a local URL. The content system 112, 122 may further be configured to send the local URL associated with the locally stored RCS data file to the RCS system 110, 120 from which it received the modified URL used to obtain the RCS data file.

The content systems 112, 122 may further be configured to receive the local URL of a locally stored RCS data file that was obtained from another content system 112, 122 from a UE 102, 104. Upon being presented with the local URL of the RCS data file, the content systems 112, 122 may be configured to retrieve the locally stored RCS data file and provide the RCS data file to the UE 102, 104 from where the local URL was received. In example embodiments, providing the RCS data file to the UE 102, 104 may entail one or more HTTPS processes, such as HTTPS get processes. By providing the RCS data file to the UE 102, 104 the RCS message transmission may be complete.

It should be noted that in some cases, RCS data files may be sent across the NNI 106 between two mobile communications networks directly, or via one or more intermediary elements, such as a network-to-network hub system 130. The network-to-network hub system 130 may, in some example embodiments, serve as a relay for one content system 112, 122 to transmit an indication of the modified URL to another content system 112, 122. Additionally, the network-to-network hub system 130 may, in some example embodiments, serve as a relay for one content system 112, 122 to transmit RCS data file associated with the modified URL to another content system 112, 122. In still other embodiments, the network-to-network hub 130 may serve as a relay for communications between the RCS systems 110, 120.

The RCS systems 110, 120 may also cooperate with the content systems 112, 122 to enable the transmission of the RCS data file from one UE 102, 104 to another UE 102, 104. In example embodiments, the RCS systems 110, 120 may be configured to receive a network address, such as an URL, associated with an RCS data file to be transmitted from a UE 102, 104. This URL pointing to the RCS data file stored on the same mobile communications network as the RCS systems 110, 120 may be received by any suitable messaging protocol. For example, protocol-based data and control communications, such as session initiation protocol (SIP) messages and/or message session relay protocol (MSRP) messages may be used to send the URL to the RCS systems 110, 120.

The RCS systems 110, 120 may be configured to identify the UE 102, 104 to which the RCS data file is to be sent, based at least in part on the message indicating the URL of the RCS data file. The RCS systems 110, 120 may identify any suitable identifying information about the terminating UE 104, such as a phone number, an international mobile equipment identity (IMEI), and/or an international mobile subscriber identity (IMSI), or the like. The RCS systems 10, 120 may be configured to determine if the UE 102, 104 that is to receive the RCS data file is on the same mobile communications network or a different mobile communications network. To do this, the RCS systems 110, 120 may be configured to access an ENUM datastore 114 (e.g., perform and ENUM dip) to identify an MNO with which the UE 102, 104 that is to receive the RCS data file is associated.

If the RCS systems 110, 120 determines that the terminating UE is on the same mobile communications network as where the RCS data file originated, then the RCS systems 110, 120 may be configured to send the RCS data file URL to the UE 102, 104 that is to receive the RCS data file. However, if the terminating UE 104 is on the second, separate mobile network, as depicted in FIG. 1, the RCS system 110 of the first mobile network may modify the RCS data file URL to indicate the second mobile network and then send the modified URL to an RCS system 120 of the second mobile network.

The RCS systems 110, 120 may be configured to modify the URL by any suitable mechanism, such as any mechanism that indicates the originating MNO and the terminating MNO. For example, when an RCS message is going from the first network to the second network, the URL may be modified by the RCS system from "first_network.mstore.com" to "nni.second_network.first_network.mstore.com." In the modified URL, "second_network" may indicate an identifier of the second mobile network, such as "tmo" for TMOBILE, "verizon" for VERIZON, "att" for AT&T, "sprint" for SPRINT, "cm" for CHINA MOBILE, "vod" for VODAPHONE, "ntt" for NT&T, "dt" for DEUTSCHE TELEKOM, "am" for AMERICA MOVIL, or the like. It should be understood that the aforementioned MNO abbreviations are examples, and any suitable abbreviation may be used to indicate the MNOs discussed herein. Additionally, although some MNOs are discussed as examples, the disclosure contemplates RCS messaging interoperability with any suitable mobile communications network throughout the world using the mechanisms as described herein. It should further be understood that the URL modification format as shown here is an example, and the disclosure contemplates any suitable URL modification that provides an indication of the second mobile network, the first mobile network, and/or an indication that the RCS message is traversing an NNI.

The RCS systems 110, 120 may be configured to send the modified URL to another RCS system 110, 120 of the UE 102, 104 to receive the RCS data file. The other RCS system 110, 120 may then provide the modified URL to its local content system 112, 122. The content system 112, 122 my retrieve the RCS data file from the content system of the other mobile communications network, store the RCS data file locally, and provide a local URL associated with the locally stored RCS data file to the RCS system 110, 120. The RCS system 110, 120 may be configured to provide the local URL to the UE 102, 104 that is to receive the RCS data file. At that point the UE 102, 104 may obtain the RCS data file form the content system 112, 122 using the local URL, as described herein.

Figure 2:
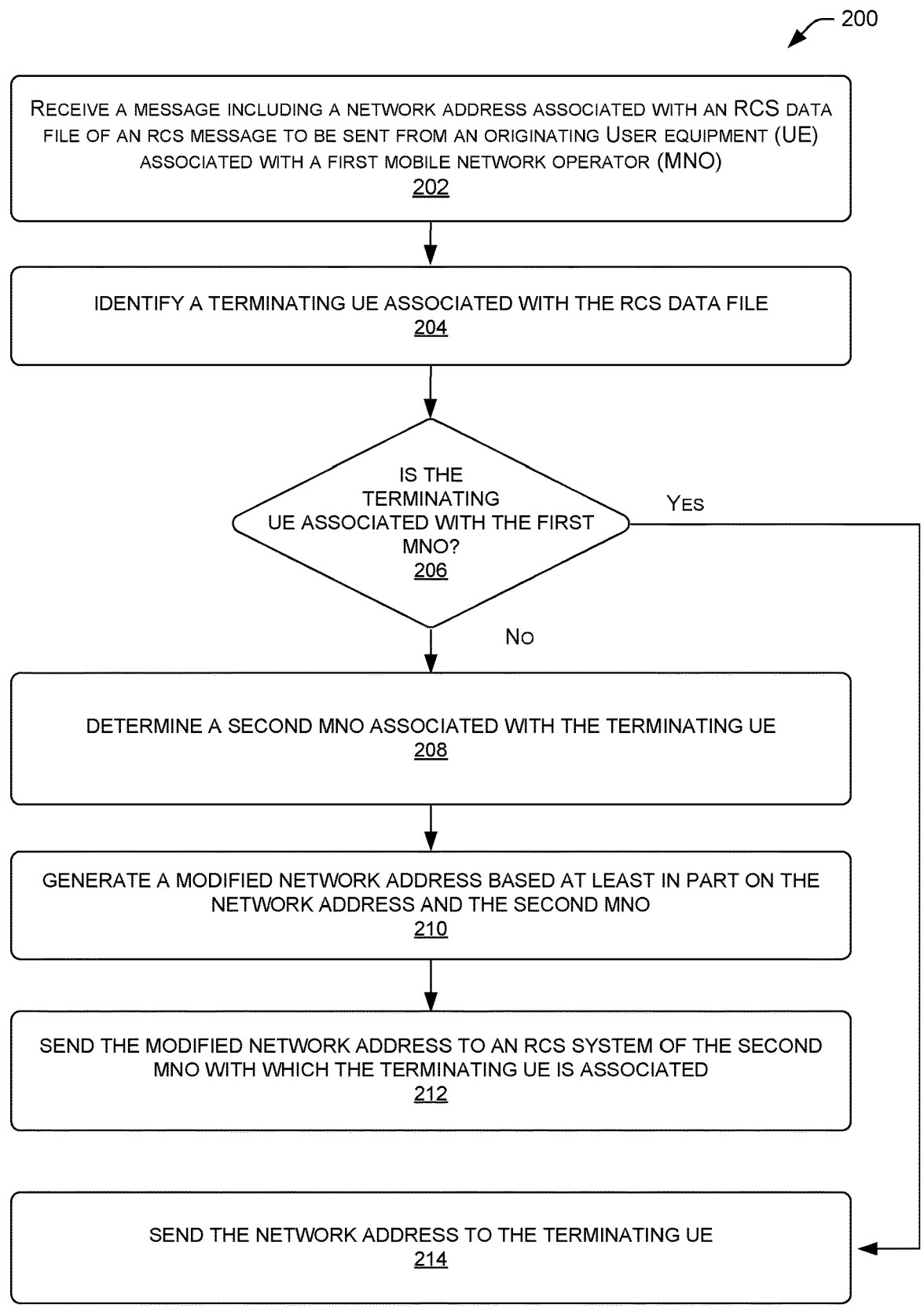
FIG. 2 illustrates a flow diagram of an example method by which a rich communications service (RCS) system may forward an address of an RCS data file, in accordance with example embodiments of the disclosure.

FIG. 2 illustrates a flow diagram of an example method 200 by which a rich communications service (RCS) system 110, 120 may forward an address of an RCS data file, in accordance with example embodiments of the disclosure. Method 200 may be performed by the RCS system 110, in cooperation with one or more entities of environment 100.

At block 202, a message may be received, where the message may include a network address associated with an RCS data file of an RCS message to be sent from an originating user equipment (UE) associated with a first mobile network operator (MNO). The network address may be an URL pointing to a location where a content system 112 stored the RCS data file. The message may be sent by any suitable mechanism and/or protocol, such as an SIP message and/or a MSRP message.

At block 204, a terminating UE associated with the RCS data file may be identified. As discussed herein, the terminating UE 104 may be identified by its phone number, IMEI, and/or IMSI, or any other suitable identifier. This identifier provides the RCS system 110 to determine whether the terminating UE is associated with the same MNO as itself.

At block 206, it may be determined if the terminating UE is associated with the first MNO. The first MNO is the MNO with which the originating UE 102 is associated. This determination may be made by accessing the ENUM datastore 114 (e.g., perform an ENUM dip) to identify an MNO of the terminating UE 104 using identifying information of the terminating UE 104 or the associated user. If the terminating UE 104 is associated with the first MNO, then the method 200 may proceed to block 214. At block 214, the network address, or the URL associated with the RCS data file stored by the content system 112 of the first MNO, may be sent to the terminating UE 104. At this point, the terminating UE 104 may be configured to obtain the RCS data file that it is to receive using the URL.

If, however, at block 206, it is determined that the terminating UE is not associated with the first MNO, then at block 208, a second MNO associated with the terminating UE may be determined. This determination may be based upon accessing the ENUM datastore 114 to identify the second MNO with which the terminating UE is associated. In some cases, the determinization that the terminating UE 104 is not associated with the first MNO, of the processes of block 206, and determining the second MNO with which the terminating UE 104 is associated may occur at the same time, such as from the same access of the ENUM datastore 114 by the RCS system 110.

At block 210, a modified network address based at least in part on the network address and the second MNO may be determined. The modified network address, in some cases, may include an identifier of the first MNO, in addition to an identifier of the second MNO. In some cases, the modified network address may also include an indication that the RCS data file is to traverse an NNI. For example, when an RCS message is going from the first network to the second network, the URL may be modified by the RCS system from "first_network.mstore.com" to "nni.second_network.first_network.mstore.com." In the modified URL, "second_network" may indicate an identifier of the second mobile network, such as "tmo" for TMOBILE, "verizon" for VERIZON, "att" for AT&T, "sprint" for SPRINT, "cm" for CHINA MOBILE, "vod" for VODAPHONE, "ntt" for NT&T, "dt" for DEUTSCHE TELEKOM, "am" for AMERICA MOVIL, or the like. It should be understood that the aforementioned MNO abbreviations are examples, and any suitable abbreviation may be used to indicate the MNOs discussed herein. Additionally, although some MNOs are discussed as examples, the disclosure contemplates RCS messaging interoperability with any suitable mobile communications network throughout the world using the mechanisms as described herein. It should further be understood that the URL modification format as shown here is an example, and the disclosure contemplates any suitable URL modification that provides an indication of the second mobile network, the first mobile network, and/or an indication that the RCS message is traversing an NNI.

At block 212, the modified network address may be sent to an RCS system of the second MNO with which the terminating UE is associated. At this point, the modified network address may be used by the RCS system 120 of the second MNO, as well as by the content system of the second MNO to acquire the RCS data file on behalf of the terminating UE 104.

It should be noted that some of the operations of method 200 may be performed out of the order presented, with additional elements, and/or without some elements. Some of the operations of method 200 may further take place substantially concurrently and, therefore, may conclude in an order different from the order of operations shown above. It should also be noted that in some cases, there may be other components of the environment 100 involved in one or more of the operations, as described herein.

Figure 3:
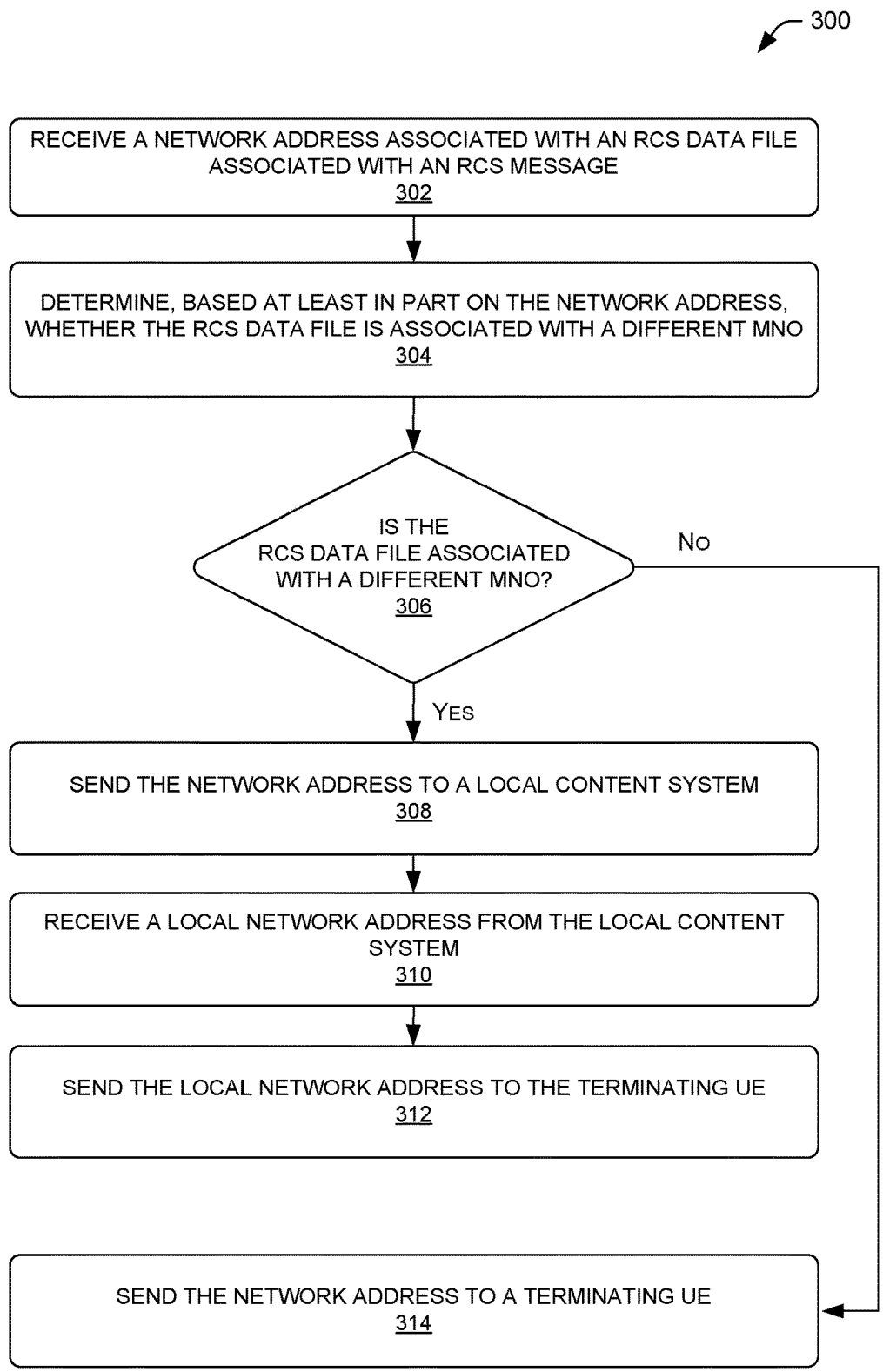
FIG. 3 illustrate a flow diagram of an example method by which an address of an RCS data file is sent to a terminating UE, in accordance with example embodiments of the disclosure.

FIG. 3 illustrate a flow diagram of an example method 300 by which an address of an RCS data file is sent to a terminating UE, in accordance with example embodiments of the disclosure. Method 300 may be performed by the RCS system 120, in cooperation with one or more entities of environment 100.

At block 302, a network address associated with an RCS data file associated with an RCS message may be received. In some cases, where the RCS data file will not traverse an NNI, the network address may be an URL of a locally saved RCS data file received from the content system 122. In other cases, if the RCS data file originates from another mobile communications network, then the URL may be an URL that has been modified by another RCS system 110, as described herein.

At block 304, whether the RCS data file is associated with a different MNO may be determined based at least in part on the network address. In example embodiments, the network address, such as the URL may be examined (e.g., parsed) by the RCS system 120 to determine if the RCS data file originated from a different mobile communications network associated with the different MNO. If the URL is identified as a modified URL as disclosed herein, then the RCS system 120 may determine that the RCS data file is associated with a different MNO.

At block 306, if the RCS data file is associated not associated with a different MNO, then the method may proceed to block 314. At block 314, the network address may be sent to a terminating UE. Thus, in this case, the RCS system 120 may relay the URL from the local content system 122 to the terminating UE 104. The terminating UE 104, at this point, can obtain the RCS data file from the content system 122.

If at block 306, it is determined that the RCS data file is associated with a different MNO, then at block 308, the network address may be sent to a local content system. At this point, the local content system 122 may identify, based at least in part on the modified URL, that it is to obtain the RCS data file from another content system 112. Accordingly, the content system 122 may obtain the RCS data file and store the RCS data file locally. The locally stored RCS data file may have a local network address, such as a local URL, associated with the locally stored RCS data file.

At block 310, a local network address may be received from the local content system. This local network address, such as a local URL, may point to the locally stored RCS data file. At block 312, the local network address may be sent to the terminating UE. With this local network address, the terminating UE 104 can obtain the RCS data file from the content system 122, such as by presenting the local network address to the content system 122.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
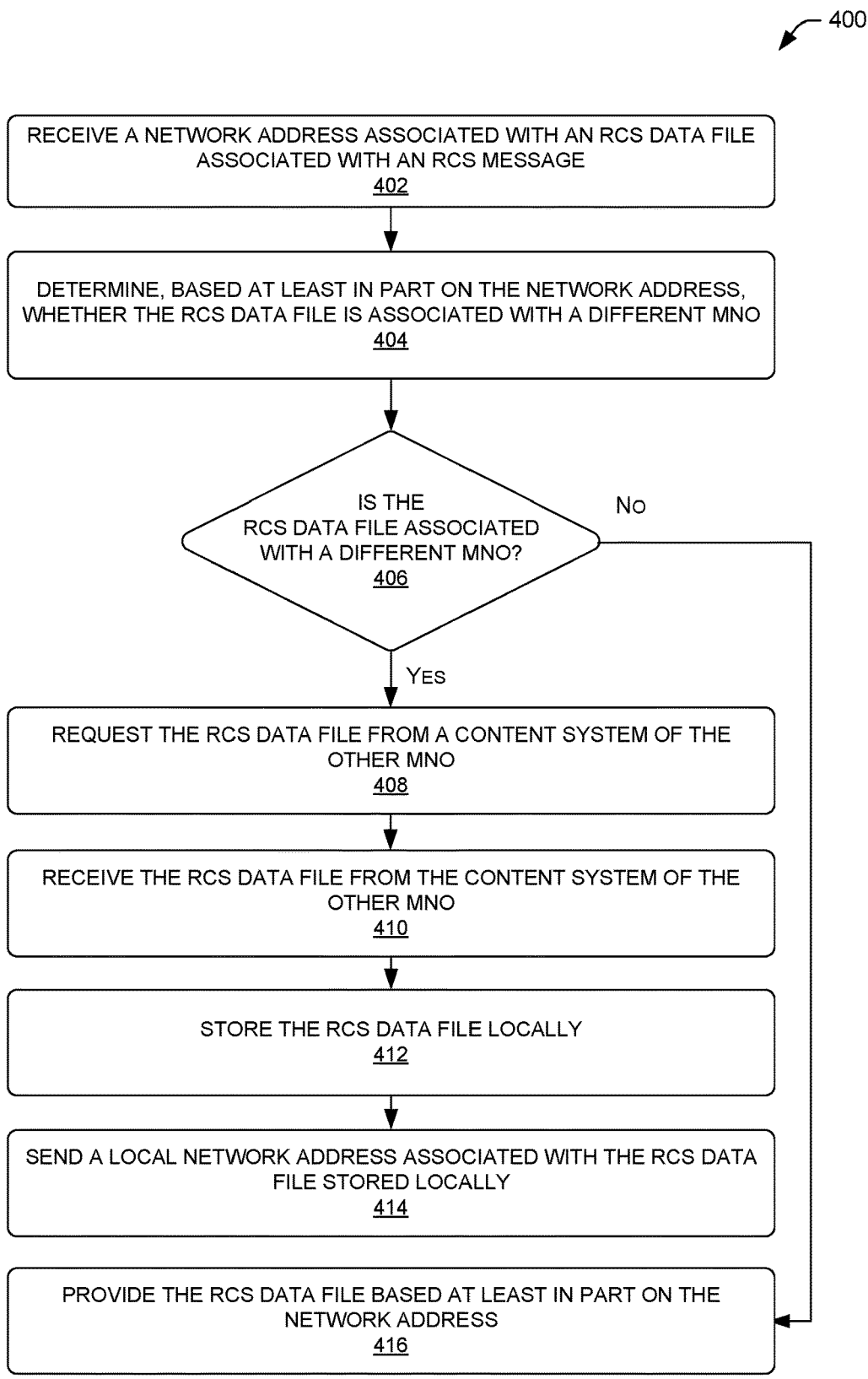
FIG. 4 illustrates a flow diagram of an example method by which a network address of an RCS data file is provided to a terminating UE, in accordance with example embodiments of the disclosure.

FIG. 4 illustrates a flow diagram of an example method by which a network address of an RCS data file is provided to a terminating UE, in accordance with example embodiments of the disclosure. The processes of method 400 may be performed by the content system 122, in cooperation with one or more other entities of environment 100.

At block 402, a network address associated with an RCS data file associated with an RCS message may be received. This network address may be an URL that points at a locally stored RCS data file, or a modified URL, as described herein, that points to a different content system 112 associated with a different MNO.

At block 404, whether the RCS data file is associated with a different MNO may be determined based at least in part on the network address. This can be determined by analyzing the received network address, such as by parsing the network address. If the received network address is in the form of the modified URL, as discussed herein, then the modified URL indicates whether the RCS data file traverses the NNI. At block 406, if it is determined that the RCS data file is not associated with a different MNO, then at block 416, the RCS data file may be provided based at least in part on the network address. In other words, the network address, in this case, points to the RCS data file, as locally stored. Thus, the content system 122 can retrieve the RCS data file and provide it to the terminating UE 104, responsive to the terminating UE 104 presenting the RCS data file to the content system 122.

If at block 406, it is determined that the RCS data file is associated with a different MNO, then at block 408, the RCS data file may be requested from the content system of the other MNO. In example embodiments, a message requesting the RCS data file and including the modified URL may be sent to the other content system 112. The other content system 112 can identify the stored location of the requested RCS data file, retrieve the RCS data file, and send the RCS data file to the content system 122. The request may be made directly by the content system 122 to the content system 112, or indirectly via the hub system 130 or other suitable intermediary entities. Thus, at block 410, the RCS data file may be received from the content system of the other MNO. The RCS data file may be received directly by the content system 122 from the content system 112, or indirectly via the hub system 130 or other suitable intermediary entities.

At block 412, the RCS data file may be stored locally. In other words, the RCS data file may be stored by the content system 122 of the MNO with which the terminating UE 104 is associated. This storage event has associated with it a local network address indicating where (e.g., location on storage and/or memory associated with the content system 122). At block 414, the local address associated with the RCS data file stored locally may be sent. This address, in example embodiments may be sent, such as in part of a message, to the RCS system 120. At that point, the RCS system 120 can provide the local network address (e.g., local URL) to the terminating UE 104, so that the terminating UE 104 can request the RCS data file from the content system 122.

It should be noted that some of the operations of method 400 may be performed out of the order presented, with additional elements, and/or without some elements. Some of the operations of method 400 may further take place substantially concurrently and, therefore, may conclude in an order different from the order of operations shown above. It should also be noted that in some cases, there may be other components of the environment 100 involved in one or more of the operations, as described herein.

Figure 5:
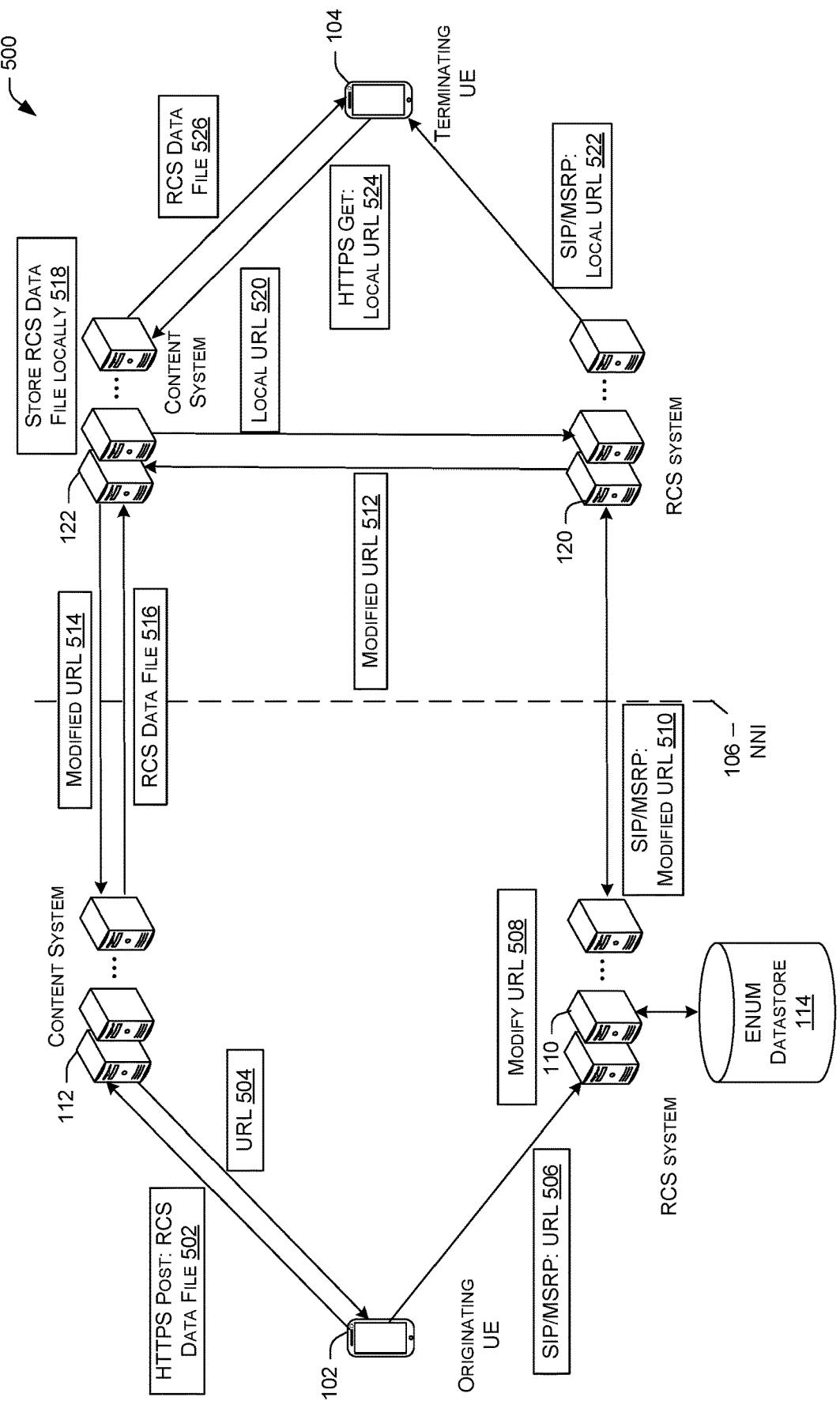
FIG. 5 illustrates a schematic diagram of an example environment where an RCS message is transmitted from an originating UE to a terminating UE, in accordance with example embodiments of the disclosure.

FIG. 5 illustrates a schematic diagram of an example environment 500 where an RCS message is transmitted from the originating UE 102 to the terminating UE 104, in accordance with example embodiments of the disclosure. In this example, the RCS message and its associated RCS data file is transmitted across an NNI, in accordance with the disclosure herein.

At block 502, the originating UE 102 may send an RCS data file, such as by way of a HTTP Post function, to the content system 112. In this case, the originating UE 102 and the content system 112 are associated with the same MNO and the same mobile communications network.

At block 504, the content system 112 may send an URL to the originating UE 102. This URL may indicate a location, such as in storage associated with the content system 112, where the received RCS data file is stored. Thus, after storing the RCS data file, as received from the originating UE 102, the content system 112 may provide the originating UE with the corresponding URL that can be used to retrieve the RCS data file by the content system 112.

At block 506, a message indicating the URL may be sent to the RCS system. This message may be carried by any suitable protocol, such as SIP and/or MSRP protocol. At block 508, the URL may be modified. The modification may be performed by the RCS system 110 in response to determining that the RCS message is to be sent to the terminating UE 104 on a different mobile communications network. The RCS system 110 may perform an ENUM dip and/or ENUM check, by accessing the ENUM datastore 114, to determine that the terminating UE 104 is on a different mobile communications network and that the RCS message and associated RCS data file will traverse the NNI 106.

The modified URL may include an identifier of the originating MNO, in addition to an identifier of the terminating MNO. In some cases, the modified network address may also include an indication that the RCS data file is to traverse the NNI 106. For example, when an RCS message is going from the first network to the second network, the URL may be modified by the RCS system from "first_network.mstore.com" to "nni.second_network.first_network.mstore.com." In the modified URL, "second_network" may indicate an identifier of the second mobile network, such as "tmo" for TMOBILE, "verizon" for VERIZON, "att" for AT&T, "sprint" for SPRINT, "cm" for CHINA MOBILE, "vod" for VODAPHONE, "ntt" for NT&T, "dt" for DEUTSCHE TELEKOM, "am" for AMERICA MOVIL, or the like. It should be understood that the aforementioned MNO abbreviations are examples, and any suitable abbreviation may be used to indicate the MNOs discussed herein. Additionally, although some MNOs are discussed as examples, the disclosure contemplates RCS messaging interoperability with any suitable mobile communications network throughout the world using the mechanisms as described herein. It should further be understood that the URL modification format as shown here is an example, and the disclosure contemplates any suitable URL modification that provides an indication of the second mobile network, the first mobile network, and/or an indication that the RCS message is traversing an NNI.

At block 510, the message indicating the modified URL may be sent from the RCS system 110 of the first MNO to the RCS system 120 of the second MNO. This message may be carried by any suitable protocol, such as SIP and/or MSRP protocol. At block 512, the RCS system 120 may send the modified URL to the content system 122 of the second MNO. Sending the modified URL may be in response to the RCS system 120 determining that the RCS data file is located at the content system 112 of a different MNO. The RCS system 120 may make this determination by analyzing the modified URL indicating the first MNO, the second MNO, and/or NNI 106 traversal.

At block 514, the content system 122 of the second MNO may request the RCS data file from the content system 112 of the first MNO by sending the modified URL to the content system 112. The modified URL may be sent using any suitable mechanism, such as an HTTP function. At block 516, the content system 112 may use the modified URL to retrieve the RCS data file stored locally by the content system 112 and send the RCS data file to the content system 122 of the second MNO.

At block 518, the content system 122 may store the RCS data file locally. There may be a local URL, or any other suitable network and/or storage address, associated with the locally stored RCS data file. At block 520, the content system 122 of the second MNO may send a message indicating the local URL to the RCS system 120 of the second MNO. This is an indication that a local (e.g., within the same mobile communications network) copy of the RCS data file is now available. At block 522, the RCS system 120 may send a message indicating the local URL to the terminating UE 104. This messaging may use any suitable protocol, such as SIP and/or MSRP protocol.

At block 524, the terminating UE 104 may request the RCS data file from the content system 122 of the second MNO. This may be done by performing processes associated with a HTTPS Get function. By presenting the local URL, the terminating UE 104 provides the network address to which the local copy of the RCS data file had been stored by the processes of block 518. At block 526, responsive to the request, the content system 122 may provide the RCS data file to the terminating UE 104. At this point, the terminating UE 104 may render (e.g., display, play a sound, etc.) the contents of the RCS data file to an associated user of the terminating UE 104.

It should be noted that some of the operations of method 500 may be performed out of the order presented, with additional elements, and/or without some elements. Some of the operations of method 500 may further take place substantially concurrently and, therefore, may conclude in an order different from the order of operations shown above. It should also be noted that in some cases, there may be other components of the environment 100 involved in one or more of the operations, as described herein.

Figure 6:
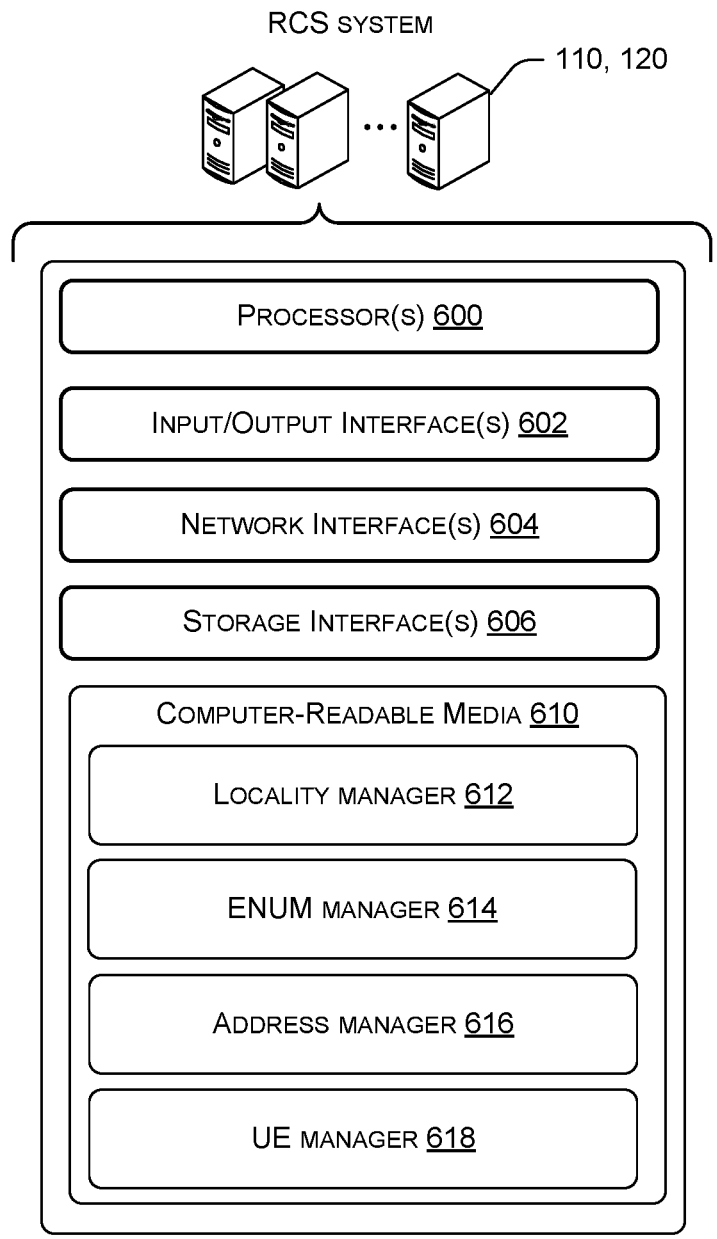
FIG. 6 illustrates a block diagram of an example RCS system that may route RCS messages, in accordance with example embodiments of the disclosure.

FIG. 6 illustrates a block diagram of an example RCS systems 110, 120 that may route RCS messages, in accordance with example embodiments of the disclosure. The RCS systems 110, 120 may include one or more processor(s) 600, one or more input/output (I/O) interface(s) 602, one or more communication interface(s) 604, one or more storage interface(s) 606, and computer-readable media 610.

In some implementations, the processors(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 600 may possess its own local memory, which also may store program modules, program data, and/or one or more operating systems. The one or more processor(s) 600 may include one or more cores.

The one or more input/output (I/O) interface(s) 602 may enable the RCS systems 110, 120 to detect interaction with a user. For example, a user may be able to maintain, update, and/or operate the RCS systems 110, 120.

The network interface(s) 604 may enable the RCS systems 110, 120 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of a cellular radio, a wireless (e.g., IEEE 802.1x-based) interface, a Bluetooth® interface, and the like.

The storage interface(s) 606 may enable the processor(s) 600 to interface and exchange data with the computer-readable medium 610, as well as any storage device(s) external to the RCS systems 110, 120. The storage interface(s) 606 may further enable access to removable media. For example, the storage interface(s) may enable the RCS systems 110, 120 to access the ENUM datastore or other repositories of UE associations.

The computer-readable media 610 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 610 may be implemented as computer-readable storage media (CRSM), which may be any available physical media accessible by the processor(s) 600 to execute instructions stored on the memory 610. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 600. The computer-readable media 610 may have an operating system (OS) and/or a variety of suitable applications stored thereon. The OS, when executed by the processor(s) 600 may enable management of hardware and/or software resources of the RCS systems 110, 120.

Several modules or components such as instruction, data stores, and so forth may be stored within the computer-readable media 610 and configured to execute on the processor(s) 600. The computer readable media 610 may have stored thereon a locality manager 612, an ENUM manager 614, an address manager 616, and a UE manager 618. It will be appreciated that each of the modules 612, 614, 616, 618, may have instructions stored thereon that when executed by the processor(s) 600 may enable various functions pertaining to receiving and/or sending RCS messages, including routing RCS data files.

The instructions stored in the locality manager 612, when executed by the processor(s) 600, may configure the RCS systems 110, 120 to determine if a received network address, or URL, is related to a locally stored RCS data file or to an RCS data file that is stored at a different mobile communications network. If the URL, such as a modified URL, is received from another RCS system 110, 120 associated with a different MNO, then the RCS system 110, 120 may be configured to determine that the RCS data file is stored at a content system 112, 122 of the other MNO. In this case, the RCS system 110, 120 may be configured to send the modified URL to a content system 112, 122 associated with the same MNO. On the other hand, if an URL, such as a local URL, is received from a content system 112, 122, then the RCS system 110, 120 may be configured to determine that the associated RCS data file is locally stored, and send the URL to a UE 102, 104.

The instructions stored in the ENUM manager 614, when executed by the processor(s) 600, may configure the RCS systems 110, 120 to receive a message with an URL from a UE 102, 104 on its own mobile communications network and determine if the associated RCS data file is to traverse an NNI 106 to complete delivery. The RCS system 110, 120 may be configured to identify a recipient individual and/or recipient UE 102, 104 by any suitable identifier, such as phone number, IMSI, IMEI, or the like, and use that identifier to determine if the recipient UE 102, 104 is on the same mobile communications network as itself, or on a different mobile communications network.

The instructions stored in the address manager 616, when executed by the processor(s) 600, may configure the RCS systems 110, 120 to modify the URLs for RCS data files that are to traverse an NNI 106, as described herein. In example embodiments, the RCS system 110, 120 may be configured to modify the URL so that the modified URL includes an indication that the RCS data file is to traverse the NNI 106. For example, when an RCS message is going from the first network to the second network, the URL may be modified by the RCS system from "first_network.mstore.com" to "nni.second_network.first_network.mstore.com." In the modified URL, "second_network" may indicate an identifier of the second mobile network.

The instructions stored in the UE manager 618, when executed by the processor(s) 600, may configure the RCS systems 110, 120 to identify, such as by phone number, IMEI, and/or IMSI, UEs 102, 104 that are sending and/or receiving RCS messages and/or associated RCS data files. The processors 600 may further be configured to determine whether a received URL is to be forwarded to a UE 102, 104, such as based on whether the received URL points to a locally stored RCS data file or at an RCS data file that is stored on a different mobile communications network.

Figure 7:
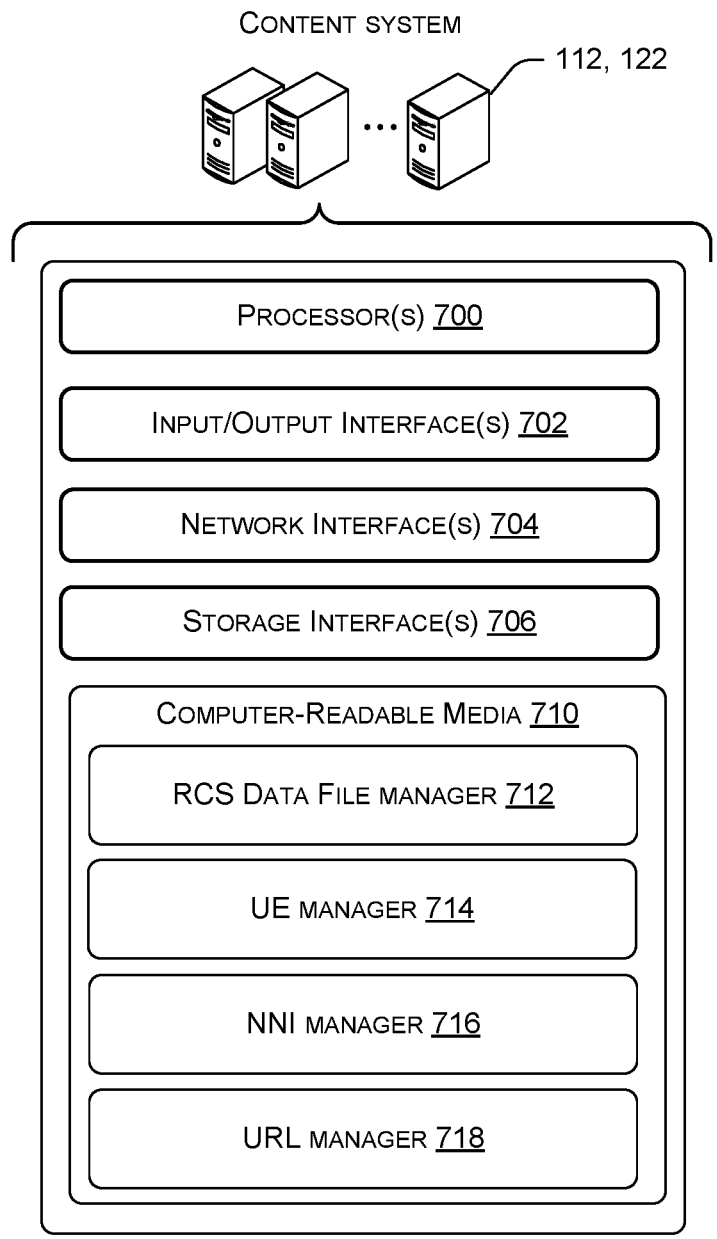
FIG. 7 illustrates a block diagram of an example content system that may store and/or retrieve RCS data files, in accordance with example embodiments of the disclosure.

FIG. 7 illustrates a block diagram of an example content system 112, 122 that may store and/or retrieve RCS data files, in accordance with example embodiments of the disclosure. The RCS systems 110, 120 may include one or more processor(s) 700, one or more input/output (I/O) interface(s) 702, one or more communication interface(s) 704, one or more storage interface(s) 706, and computer-readable media 710. The descriptions of the one or more processor(s) 700, the one or more input/output (I/O) interface(s) 702, the one or more network interface(s) 704, the one or more storage interface(s) 706, and the computer-readable media 710 may be substantially similar to the descriptions of the one or more processor(s) 600, the one or more input/output (I/O) interface(s) 602, the one or more network interface(s) 604, the one or more storage interface(s) 606, and the computer-readable media 610, respectively, as described in FIG. 6 with respect to the RCS systems 110, 120, and in the interest of brevity, will not be repeated here.

Several modules such as instruction, data stores, and so forth may be stored within the computer-readable media 710 and configured to execute on the processor(s) 700. The computer readable media 710 may have stored thereon an RCS data file manager 712, a UE manager 714, an NNI manager 716, and an URL manager 718. It will be appreciated that each of the modules 712, 714, 716, 718, may have instructions stored thereon that when executed by the processor(s) 700 may enable various functions pertaining to the operations of the content systems 112, 122.

The instructions stored in the RCS data file manager 712, when executed by the processor(s) 700, may configure the content systems 112, 122 to receive and/or send RCS data files. The content systems 112, 122, when presented with an URL may be configured to retrieve, such as from storage, a corresponding RCS data file, and present the requestor with the RCS data file. In some cases, the RCS data file may be requested with a modified URL from another content system 112, 122, and in other cases, the RCS data file may be requested by a UE 102, 104 that is on the same mobile communications network as the content system 112, 122.

The instructions stored in the UE manager 714, when executed by the processor(s) 700, may configure the content systems 112, 122 to interact with UEs 102, 104 to upload and/or download data, such as RCS data files. The content systems 112, 122 may be configured to engage in HTTP file transfer processes, such as HTTPS Post, HTTPS Get, or the like.

The instructions stored in the NNI manager 716, when executed by the processor(s) 700, may configure the content systems 112, 122 to retrieve and/or provide data across the NNI 106. The content systems 112, 122 may be configured to present a modified URL, either directly or via a hub system or other intermediary entities, to another content system 112, 122. In response to receiving the modified URL, the other content system 112, 122 may be configured to retrieve the data, such as the RCS data file, from storage and send the RCS data file to the content system 112, 122 that provided the modified URL.

The instructions stored in the URL manager 718, when executed by the processor(s) 700, may configure the content systems 112, 122 to receive and/or send URLs to other entities to enable transmission of RCS data files. The processor(s) 700 may further be configured to store RCS data files locally and provide a local URL corresponding to the stored RCS data file.

Figure 8:
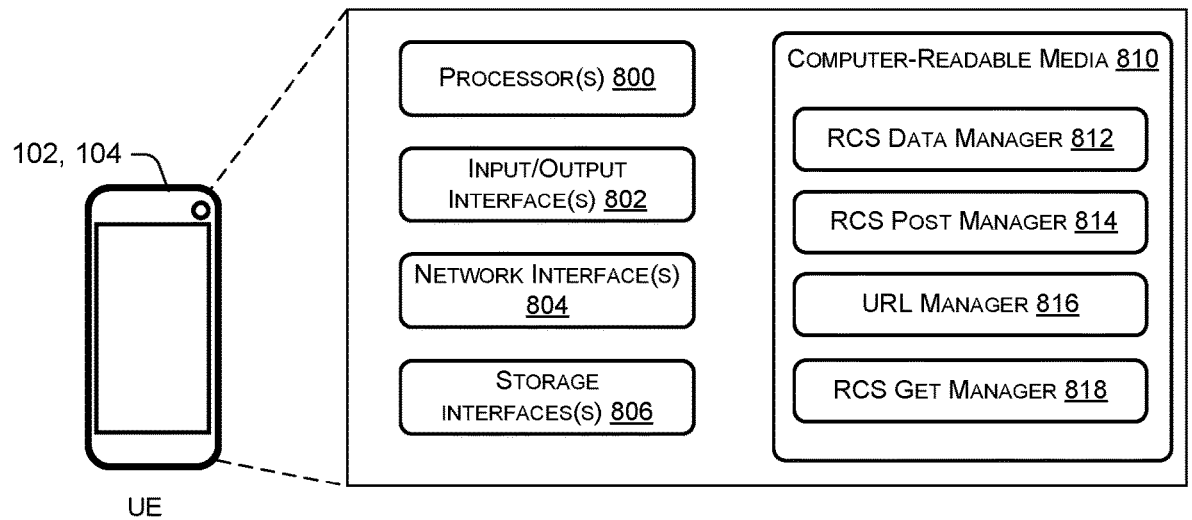
FIG. 8 illustrates a block diagram of an example UE that may be configured to send and/or receive RCS messages, in accordance with example embodiments of the disclosure.

FIG. 8 illustrates a block diagram of an example UE 102, 104 that may be configured to send and/or receive RCS messages, in accordance with example embodiments of the disclosure.

In accordance with various embodiments disclosed herein, the terms user equipment (UE), communication device, device, wireless communication device, wireless device, mobile device, terminal, wireless terminal, mobile terminal, and client device, may be used interchangeably herein to describe the UE 102, 104. The UE 102, 104 may be configured for transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio, Second Generation (2G), Third Generation (3G), Fourth Generation (4G), Fifth Generation (5G), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Voice over New Radio (VoNR), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 102, 104 may include one or more processor(s) 800, one or more input/output (I/O) interface(s) 802, one or more network interface(s) 804, one or more storage interface(s) 806, and computer-readable media 810. The descriptions of the one or more processor(s) 800, the one or more input/output (I/O) interface(s) 802, the one or more network interface(s) 804, the one or more storage interface(s) 806, and the computer-readable media 810 may be substantially similar to the descriptions of the one or more processor(s) 600, the one or more input/output (I/O) interface(s) 602, the one or more network interface(s) 604, the one or more storage interface(s) 606, and the computer-readable media 610, respectively, as described in FIG. 6 with respect to the RCS systems 110, 120, and in the interest of brevity, will not be repeated here.

Several modules or components such as instruction, data stores, and so forth may be stored within the computer-readable media 810 and configured to execute on the processor(s) 800. The computer readable media 810 may have stored thereon an RCS data manager 812, an RCS post manager 814, an URL manager 816, and an RCS get manager 818. It will be appreciated that each of the modules 812, 814, 816, 818, may have instructions stored thereon that when executed by the processor(s) 800 may enable various functions pertaining to the operations of the UEs 102, 104.

The instructions stored in the RCS data manager 812, when executed by the processor(s) 800, may configure the UEs 102, 104 to generate an RCS data file, such as based upon user input, and generate a message for a local content system indicating the recipient UE 102, 104 of the RCS message. The UEs 102, 104 may also be configured to render the RCS message and associated RCS data files to users of the UEs 102, 104.

The instructions stored in the RCS post manager 814, when executed by the processor(s) 800, may configure the UEs 102, 104 to post data files, such as RCS data files, to the content systems 112, 122. The UEs 102, 104 may be configured to perform HTTP processes, such as HTTPS Post processes.

The instructions stored in the URL manager 816, when executed by the processor(s) 800, may configure the UEs 102, 104 to receive and send URLs for RCS data files. The UEs 102, 104 may also be configured to send the URLs to the RCS systems 112, 122.

The instructions stored in the RCS get manager 818, when executed by the processor(s) 800, may configure the UEs 102, 104 to get data files, such as RCS data files, from the content systems 112, 122. The UEs 102, 104 may be configured to perform HTTP processes, such as HTTPS Get processes.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   one or more processors; and
   one or more computer-readable media storing computer-executable instructions that, when executed by the one or more processors, cause the one or more processors to perform operations comprising:
   receiving a first uniform resource locator (URL) associated with a first location where a data file is stored at a first content system, the first URL originating from the first content system associated with a first user equipment (UE) and a first mobile network operator (MNO);
   determining that the data file is to be provided to a second UE;
   determining that the second UE is associated with a second MNO;
   retrieving the data file from the first location at the first content system;
   storing the data file at a second location associated with a second content system, the second content system remote from the second UE;
   generating, based at least in part on the determining that the second UE is associated with the second MNO and that the data file is to be provided to the second UE, a second URL associated with the second location associated with the second content system; and
   providing the second URL to a messaging system associated with the second MNO, the second URL to allow the second UE to access the data file from the second location associated with the second content system.

2. The system of claim 1, wherein the second URL identifies the first content system.

3. The system of claim 1, wherein the second URL indicates a first identity of the first MNO and a second identity of the second MNO.

4. The system of claim 1, wherein the first URL is generated by the first content system and is received from the first UE.

5. The system of claim 1, wherein determining that the second UE is associated with the second MNO further comprises accessing an E.164 Number to Universal Resource Indicator Mapping (ENUM) database.

6. The system of claim 1, wherein the operations further comprise:
   receiving a third URL associated with a third location where a second data file is stored, the third URL originating from the first content system;
   determining that the second data file is to be provided to a third UE;
   determining that the third UE is associated with the first MNO;
   determining that the third URL is not to be modified; and
   providing the third URL to the third UE.

7. The system of claim 1, wherein providing the second URL to the messaging system associated with the second MNO further comprises initiating a session with the messaging system associated with the second MNO using session initiation protocol (SIP).

8. The system of claim 1, wherein the data file comprises a Rich Communications Services (RCS) data file that is to be transmitted from the first UE to the second UE.

9. A computer-implemented method, comprising:
   receiving a first uniform resource locator (URL) associated with a first location where a data file is stored at a first content system, the first URL originating from the first content system associated with a first user equipment (UE) and a first mobile network operator (MNO);
   determining that the data file is to be provided to a second UE;
   determining that the second UE is associated with a second MNO;
   retrieving the data file from the first location at the first content system;
   storing the data file at a second location associated with a second content system, the second location remote from the second UE;
   generating, based at least in part on the determining that the second UE is associated with the second MNO and that the data file is to be provided to the second UE, a second URL associated with the second location associated with the second content system; and
   providing the second URL to a messaging system associated with the second MNO, the second URL to allow the second UE to access the data file from the second location associated with the second content system.

10. The computer-implemented method of claim 9, wherein the second URL identifies the first content system.

11. The computer-implemented method of claim 9, wherein the second URL indicates a first identity of the first MNO and a second identity of the second MNO.

12. The computer-implemented method of claim 9, wherein the location is a first location, the computer-implemented method further comprising:
   receiving a third URL associated with a third location where a second data file is stored, the third URL originating from the first content system;
   determining that the second data file is to be provided to a third UE;
   determining that the third UE is associated with the first MNO;
   determining that the third URL is not to be modified; and
   providing the third URL to the third UE.

13. The computer-implemented method of claim 9, wherein the data file comprises a Rich Communications Services (RCS) data file that is to be transmitted from the first UE to the second UE.

14. The computer-implemented method of claim 9, wherein providing the second URL to the messaging system associated with the second MNO further comprises initiating a session with the messaging system associated with the second MNO using session initiation protocol (SIP).

15. One or more computer-readable media storing computer-executable instructions that, when executed by one or more processors, cause the one or more processors to perform operations comprising:
   receiving a first uniform resource locator (URL) associated with a first location where a data file is stored at a first content system, the first URL originating from the first content system associated with a first user equipment (UE) and a first mobile network operator (MNO);
   determining that the data file is to be provided to a second UE;
   determining that the second UE is associated with a second MNO;
   retrieving the data file from the first location at the first content system;
   storing the data file at a second location associated with a second content system, the second content system remote from the second UE;
   generating, based at least in part on the determining that the second UE is associated with the second MNO and that the data file is to be provided to the second UE, a second URL associated with the second location associated with the second content system; and
   providing the second URL to a messaging system associated with the second MNO, the second URL to allow the second UE to access the data file from the second location associated with the second content system.

16. The one or more computer-readable media of claim 15, wherein the first URL is generated by the first content system and is received from the first UE.

17. The one or more computer-readable media of claim 15, wherein determining that the second UE is associated with the second MNO further comprises accessing an E.164 Number to Universal Resource Indicator Mapping (ENUM) database.

18. The one or more computer-readable media of claim 15, wherein the data file comprises a Rich Communications Services (RCS) data file that is to be transmitted from the first UE to the second UE.

19. The one or more computer-readable media of claim 15, wherein the operations further comprising:
   receiving a third URL associated with a third location where a second data file is stored, the third URL originating from the first content system;
   determining that the second data file is to be provided to a third UE;
   determining that the third UE is associated with the first MNO;
   determining that the third URL is not to be modified; and
   providing the third URL to the third UE.

20. The one or more computer-readable media of claim 15, wherein providing the second URL to the messaging system associated with the second MNO further comprises initiating a session with the messaging system associated with the second MNO using session initiation protocol (SIP).

* * * * *